Patented May 18, 1937

2,080,862

UNITED STATES PATENT OFFICE 2,080,862

INDIGOID VAT DYESTUFFS

Jaroslav Froehlich, Basel, Switzerland, assignor to the firm Society of Chemical Industry In Basle, Basel, Switzerland No Drawing. Application December 11, 1936, Serial No. 115,446. In Switzerland December 31, 1935

5 Claims. (Cl. 260—53)

This invention relates to the manufacture of new indigoid vat dyestuffs by either oxidizing hydroxythionaphthenes and indoxyls containing at least one alkoxy-alkoxy-group, or by condensing them or their reactive 2-derivatives with components suitable for making indigoid dyestuffs, and if desired halogenating the dyestuffs thus produced.

The hydroxythionaphthenes and indoxyls or their reactive 2-derivatives used as parent materials may be made by the usual general methods, for example from amines and sulfonic acids which contain at least one alkoxy-alkoxy-group, for instance a methoxy-ethoxy- or an ethoxy-ethoxy-group, by the various syntheses, for example the Herz sulfur monochloride synthesis, the Sandmeyer syntheses, the Bayer syntheses or the Heumann syntheses. These amines and sulfonic acids which may belong for example to the benzene or naphthalene series, may contain further substituents beside the alkoxy-alkoxy-groups, for example halogen, alkyl- and alkoxy-groups.

The indigoid dyestuffs are made by a method in itself known, for example by oxidation of the hydroxythionaphthenes and indoxyls by means of sulfur or potassium ferricyanide or by condensation of the hydroxythionaphthenes and indoxyls as such or in the form of their reactive 2-derivatives, for instance the 2-anil or 2-keto compounds, in solution or in suspension, for instance in concentrated sulfuric acid, in benzene, in chlorobenzene or in tetrachlorethane with indigoid components, for instance 1-hydroxynaphthalenes (or a halogen derivative, for instance 4-chloro- or 4-bromo-1-hydroxynaphthalenes, or an alkoxy derivative, for instance 4-ethoxy- and 4-methoxy-1-hydroxynaphthalenes), hydroxyanthracenes, or five-membered condensed ring systems, for example isatins, naphthisatins, indoxyls, thionaphthenequinones, hydroxythionaphthenes and acenaphthenequinones. In such a manner there are obtained both symmetrical and unsymmetrical indigoid dyestuffs.

The new indigoid dyestuffs may be treated with halogenating agents; they may also be converted into their leuco-ester salts. They may be used for dyeing and printing vegetable, animal and artificial fibers, for instance cotton, wool and acetate artificial silk, or as pigments. In comparison with the known indigoid dyestuffs they are distinguished by their free solubility in organic solvents, such as chlorobenzene, a property which fits them for use in coloring masses and lacquers of various kinds and origin.

The following examples illustrate the invention, the parts being by weight:—

Example 1

224 parts of 5-methoxy-ethoxy-3-hydroxythionaphthene are dissolved with aid of heat in 1000 parts of caustic soda solution of 12 per cent. strength with the addition of some alcohol; this solution is mixed while gently boiling with the quantity of a ground aqueous suspension of sulfur calculated as necessary for the oxidation and added in portions. After a short boiling the formation of dyestuff is complete. The mass is filtered and the dyestuff of the formula

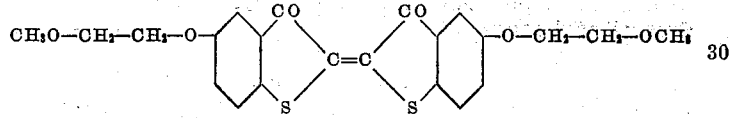

washed and dried. It is a violet powder soluble in concentrated sulfuric acid to a yellow-green solution. It dissolves surprisingly freely in hot chlorobenzene and crystallizes therefrom in the form of violet needles of melting point 221° C. The dyestuff forms a yellow vat which dyes cotton reddish tints.

If in this example instead of 5-methoxy-ethoxy-3-hydroxythionaphthene there is used the same proportion of 6-methoxy-ethoxy-3-hydroxythionaphthene there is obtained a dyestuff of the formula

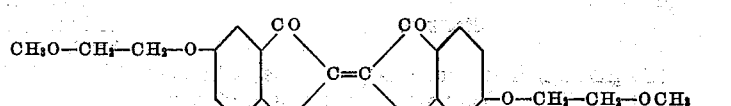

which dissolves in sulfuric acid to a violet solution. It crystallizes from chlorobenzene in the form of orange needles of melting point 267–268° C. It dyes cotton in a yellow vat orange tints. It dyes nitrocellulose lacquer clear orange tints when applied in the manner usual for dyeing nitrocellulose lacquers.

The 5-methoxy-ethoxy-3-hydroxythionaphthene may be made as follows: 4-nitro-1-phenol is converted into 1-methoxy-ethoxy-4-nitrobenzene by treatment with the toluene sulfonic acid ester of glycol-mono-methyl ether. This product is reduced by means of iron in presence of glacial acetic acid in an aqueous alcoholic solution to produce 1-methoxy-ethoxy-4-aminobenzene from which by diazotization, reaction with potassium xanthate, saponification and condensation with chloracetic acid the 1-methoxy-ethoxy-phenyl-4-thioglycolic acid of melting point 59° C. is obtained. From this thioglycolic acid there is produced by treatment with phosphorus trichloride and aluminum chloride the 5-methoxy-ethoxy-3-hydroxy-thionaphthene which distils under 4 mm. pressure at 190° C.

The 6-methoxy-ethoxy-3-hydroxythionaphthene may be made as follows:—4-methoxy-ethoxy-1-aminobenzene hydrochloride is treated by the Herz method with sulfur chloride at 30–50° C. The 4-methoxy-ethoxy-1:2-phenylene-thiazothionium chloride thus obtained is saponified by introduction into aqueous alkali and is condensed which chloracetic acid whereby the anhydride of 4-methoxy-ethoxy-1-amino-2-phenyl-thio-glycolic acid is obtained; this crystallizes from water in the form of colorless needles of melting point 134° C. From this thio-glycolic acid the nitrile is obtained by diazotization and reaction with copper cyanide and the nitrile is converted into 6-methoxy-ethoxy-3-hydroxythionaphthene by treatment with sodium sulfide and then with hydrochloric acid.

*Example 2*

224 parts of 6-methoxy-ethoxy-3-hydroxythionaphthene and 282 parts of 2-(para-dimethylamino-)anil of 3-hydroxythionaphthene are mixed with 4000 parts of alcohol and preferably with a condensation accelerator, for instance sodium carbonate or ammonia, and the mixture is heated to boiling. When condensation is complete the dyestuff of the formula

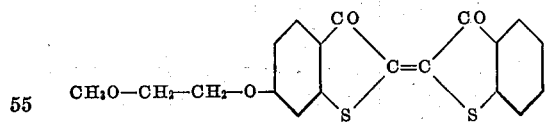

is filtered, washed and dried. It is an orange powder, soluble in concentrated sulfuric acid to a green solution. It crystallizes from chlorobenzene in the form of orange needles of melting point 245° C. and dyes cotton in a yellow vat brick red tints. When finely suspended in the usual dispersion agents it dyes acetate artificial silk red tints.

*Example 3*

174 parts of 4-methoxy-1-hydroxynaphthalene are dissolved in 2000 parts of benzene and there are added at 70° C. a solution of 5-methoxy-ethoxy-isatin chloride made in the known manner from 221 parts of 5-methoxy-ethoxy-isatin and 250 parts of phosphorus pentachloride in benzene. After stirring for a short time condensation is complete. After filtering, washing and drying the dyestuff of the formula

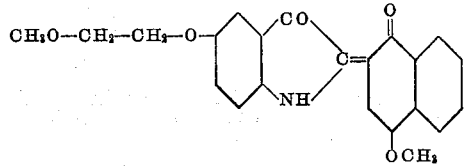

is obtained in the form of a black-blue powder soluble in concentrated sulfuric acid to a green solution and in chlorobenzene, benzene or alcohol to a blue solution. It dyes cotton in a yellow vat blue tints.

If in this example there are substituted for the 4-methoxy-1-hydroxynaphthalene 257 parts of 4:6-dimethyl-7-bromo-3-hydroxythionaphthene there is obtained a dark violet dyestuff which dissolves in concentrated sulfuric acid to a green solution and dyes cotton violet tints in a yellow vat.

The 5-methoxy-ethoxy-isatin used in this example may be made as follows: 1-methoxy-ethoxy-4-aminobenzene is condensed by the Sandmeyer method with hydroxylamine and chloral hydrate. From the 1-methoxy-ethoxy-4-iso-nitroso-acetanilide thus formed there is made by treatment with sulfuric acid of 97 per cent. strength at 80° C. the 5-methoxy-isatin which crystallizes from water in the form of dark red needles of melting point 151° C.

*Example 4*

224 parts of 6-methoxy-ethoxy-3-hydroxythionaphthene are dissolved in 2000 parts of chlorobenzene and at 70° C. there is added a solution of the 5:7-dichlorisatin chloride made in the known manner from 216 parts of 5:7-dichlorisatin and 250 parts of phosphorous pentachloride in chlorobenzene. After stirring for a short time condensation is complete. After filtering, washing and drying the dyestuff of the formula

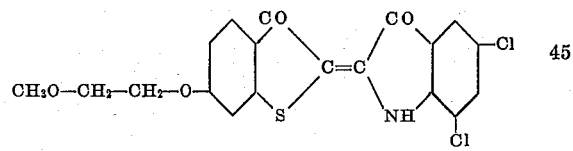

is obtained in the form of a blue-red powder soluble in concentrated sulfuric acid to a green solution and dyeing cotton in a red-yellow vat Bordeaux red tints. It dissolves freely in hot chlorobenzene and crystallizes therefrom in the form of dark red needles of melting point 257–258° C.

If in this example 305 parts of 5:7-dibromisatin are substituted for the 5:7-dichlorisatin a dyestuff of similar properties is obtained.

*Example 5*

224 parts of 6-methoxy-ethoxy-3-hydroxythionaphthene and 330.5 parts of 2-(para-dimethylamino-)anil of 5-chloro-7-methyl-3-hydroxythionaphthene are mixed together in 4000 parts of alcohol, preferably with the addition of some sodium carbonate and the mixture is heated to boiling. When condensation is complete the dyestuff of the formula

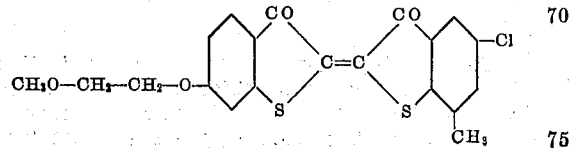

is filtered, washed and dried. It is a dark red powder soluble in concentrated sulfuric acid to a violet-blue solution. It forms a yellow vat and dyes cotton red tints. It dyes acetate artificial silk by the usual dyeing operations red-violet. It colors nitrocellulose lacquer strong violet tints.

*Example 6*

224 parts of 6-methoxy-ethoxy-3-hydroxythionaphthene and 326 parts of 2-(para-dimethylamino-)anil of 6-ethoxy-3-hydroxythionaphthene are together mixed in 4000 parts of alcohol and the mixture is heated to boiling. When condensation is complete the dyestuff of the formula

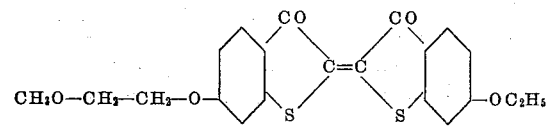

is filtered, washed and dried. It is an orange powder soluble in concentrated sulfuric acid to a pure violet-blue. It crystallizes from chlorobenzene in the form of orange needles of melting point 274° C. and dyes cotton in a yellow vat orange tints. It dyes wool strong orange tints fast to milling.

*Example 7*

356 parts of 2-(para-dimethylamino-)anil of 6-methoxy-ethoxy-3-hydroxythionaphthene and 213 parts of 4:6-dimethyl-7-chloro-3-hydroxythionaphthene are together mixed in 4000 parts of alcohol and the mixture is heated to boiling. When condensation is complete the dyestuff of the formula

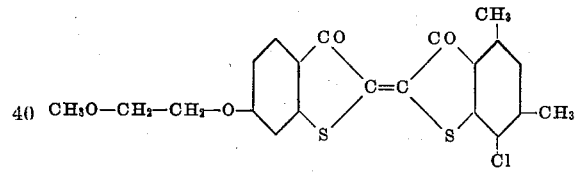

is filtered, washed and dried. It is a red powder soluble in concentrated sulfuric acid to a green solution and dyes cotton in a yellow vat fast pure red tints. From chlorobenzene it crystallizes in the form of red needles of melting point 260° C.

The 2-(para-dimethylamino-)anil of 6-methoxy-ethoxy-3-hydroxythionaphthene is made by action of para-nitroso-dimethyl-aniline hydrochloride on 6-methoxy-ethoxy-3-hydroxythionaphthene.

*Example 8*

174 parts of 4-methoxy-1-hydroxynaphthalene are dissolved in 6000 parts of chlorobenzene and at 20° C. there is added a solution of 5-methoxy-ethoxy-7-chlorisatin chloride made in known manner from 255 parts of 5-methoxy-ethoxy-7-chlorisatin and 250 parts of phosphorous pentachloride in chlorobenzene. After a short stirring at 40° C. the condensation is complete. When filtered, washed and dried the dyestuff of the formula

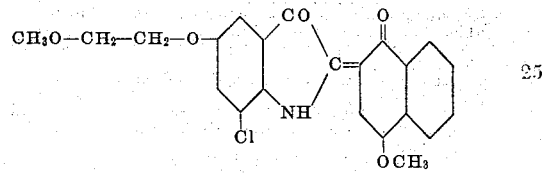

has the form of blue needles soluble in concentrated sulfuric acid to a green solution. It crystallizes from chlorobenzene in the form of green-blue needles of melting point 256° C. When printed on cotton it yields a pure very fast blue-green.

The 5-methoxy-7-chlorisatin is made by treating 5-methoxy-ethoxy-isatin with sulfuryl chloride at 60–70° C. in glacial acetic acid. It crystallizes from dilute alcohol in red-orange needles of melting point 221° C.

The following table comprises a number of further dyestuffs obtainable by this invention:—

| | Color of dyestuff | Melting point C. | Color of solution in conc. $H_2SO_4$ | Color of vat | Dyeing on cotton |
|---|---|---|---|---|---|
| 5-methoxy-ethoxy-3-hydroxy-thionaphthene condensed with: | | | | | |
| (1) 2-(para-dimethylamino-) anil of 3-hydroxythionaphthene. | Red | 227–228° | Green | Yellow | Red-violet. |
| (2) 2-(para-dimethylamino-) anil of 2:1-naphth-thio-indoxyl. | Brown-violet | 267° | Violet | Yellow | Brown. |
| (3) 5:7-dibromisatin chloride | Blue | 229–230° | Green-blue | Red-yellow | Blue. |
| (4) 5-bromisatin chloride | Blue | | Green-blue | Green-yellow | Blue-grey. |
| (5) 2-(para-dimethylamino-) anil of 5-chloro-7-methyl-3-hydroxythionaphthene. | Red-violet | 267° | Yellow-green | Yellow | Violet. |
| 2-(para-dimethylamino-) anil of 5-methoxy-ethoxy-3-hydroxy-thionaphthene condensed with: | | | | | |
| (6) 4:6 - dimethyl - 5:7 - dichloro - 3 - hydroxythionaphthene. | Violet | 264° | Green | Yellow-orange | Red-violet. |
| (7) 3-hydroxythionaphthene | Violet | 228° | Green | Yellow | Red-violet. |
| 6-methoxy-ethoxy-3-hydroxythionaphthene condensed with: | | | | | |
| (8) 2-(para-dimethylamino-) anil of 2:1-naphth-thio-indoxyl. | Red-brown | 273° | Red-violet | Red-yellow | Red-brown. |
| (9) 5-bromisatin chloride | Brown-violet | 293° | Blue-green | Red-yellow | Brown-heliotrope. |
| (10) 4-methyl-5-chloro-7-methoxyisatin chloride | Brown-violet | 236° | Green | Yellow | Violet. |
| (11) 4:5-dichloro-7-methoxy-isatin | Violet | 248° | Green | Yellow | Violet. |
| (12) 4:7-dimethyl-isatin chloride | Red-violet | 238° | Blue | Yellow | Red-violet. |
| (13) 4-chloro-7-methoxy-isatin chloride | Brown-violet | 244° | Blue-green | Yellow | Violet. |
| (14) 2-(para-dimethylamino-) anil of 6-amino-3-hydroxythionaphthene. | Red-orange | 284° | Blue | Yellow | Brown-orange. |
| (15) 2-(para-dimethylamino-) anil of 6-chloro-5-methyl-3-hydroxythionaphthene. | Red-violet | 236° | Red-violet | Yellow | Red. |
| (16) 2-(para-dimethylamino-) anil of 1:2-naphth-thio-indoxyl. | Dark brown | 263° | Red-violet | Yellow | Brown-red. |
| 2-(para-dimethylamino-) anil of 6-methoxy-ethoxy-3-hydroxythionaphthene condensed with: | | | | | |
| (17) 4:6-dimethyl-7-bromo-3-hydroxythionaphthene | Red-orange | 262° | Green | Yellow | Red. |
| (18) 4:6-dimethyl-5:7-dichloro-3-hydroxy-thionaphthene. | Red-orange | | Green | Yellow | Bluish red. |
| (19) 8-chloro-1:2-naphth-thio-indoxyl | Red-brown | 271° | Violet | Yellow | Red-brown. |
| 5-methoxy-ethoxy-isatin chloride condensed with: | | | | | |
| (20) 6-methoxy-ethoxy-3-hydroxythionaphthene | Blue | 251° | Red-violet-green. | Orange | Grey-blue. |
| (21) 4-chloro-1-hydroxy-naphthalene | Blue | 205° | Green-blue | Green-yellow | Grey-blue. |
| (22) 3-hydroxythionaphthene | Grey-blue | | Blue-green | Yellow | Grey-blue. |

| | Color of dyestuff | Melting point C. | Color of solution in conc. H₂SO₄ | Color of vat | Dyeing on cotton |
|---|---|---|---|---|---|
| (23) 4:6-dimethyl-5:7-dichloro-3-hydroxythionaphthene. | Blue | 272° | Green | Yellow | Blue. |
| (24) 3-hydroxythionaphthene-2-carbonic acid or 3-hydroxythionaphthene. | Brown-red | 271° | Yellow-brown | Yellow | Brown-red. |
| 5-methoxy-ethoxy-7-chlorisatin chloride condensed with: | | | | | |
| (25) 4-chloro-1-hydroxynaphthalene | Blue | 224° | Greenish blue | Yellow | Blue. |
| (26) 4-benzoyl-1-hydroxynaphthalene | Blue | 261° | Green | Orange-brown | Blue. |
| 5-methoxy-ethoxy-7-bromisatin chloride condensed with: | | | | | |
| (27) 4-bromo-1-hydroxynaphthalene | Blue | 230° | Green-blue | Yellow | Blue. |
| 5-ethoxy-ethoxy-isatin chloride condensed with: | | | | | |
| (28) 4-methoxy-1-hydroxynaphthalene | Blue | 195° | Green-blue | Yellow | Blue. |
| (29) 1-hydroxynaphthalene | Blue | | Green | Yellow | Greenish-blue. |
| (30) 6-methoxy-ethoxy-3-hydroxythionaphthene | Blue | 242° | Violet-green | Greenish-yellow | Greenish-blue. |
| (31) 6-ethoxy-ethoxy-3-hydroxythionaphthene | Blue | 241° | Violet-green | Greenish-yellow | Green-blue. |
| 6-ethoxy-ethoxy-3-hydroxythionaphthene condensed with: | | | | | |
| (32) 5-methoxy-ethoxy-isatin chloride | Blue | 241° | Violet-green | Yellow | Green-blue. |
| (33) 2-(para-dimethylamino-)anil of 6-ethoxy-3-hydroxythionaphthene. | Orange | 259° | Violet | Yellow | Orange. |
| (34) 2-(para-dimethylamino-) anil of 3-hydroxythionaphthene. | Red | 227° | Green | Yellow | Red. |
| (35) 2-(para-dimethylamino-) anil of 6-ethoxy-ethoxy-3-hydroxythionaphthene. | Orange | 256° | Violet | Yellow | Orange. |
| (36) 2-(para-dimethylamino-) anil of 5-chloro-7-methyl-3-hydroxythionaphthene. | Red-orange | 253° | Green | Yellow | Bluish-red. |
| (37) 2-(para-dimethylamino-) anil of 6-amino-3-hydroxythionaphthene. | Red-brown | 285° | Green-blue | Yellow | Brown. |
| 2-(para-dimethylamino-) anil of 6-ethoxy-ethoxy-3-hydroxythionaphthene condensed with: | | | | | |
| (38) 4:6 - dimethyl - 5:7 - dichloro-3-hydroxythionaphthene. | Red-orange | 290° | Green | Yellow | Pink. |
| 4-methyl-5-chloro-7-methoxy-ethoxy-isatin-2-chloride condensed with: | | | | | |
| (39) 4-methoxy-1-hydroxynaphthalene | Blue | 227° | Green-blue | Yellow | Blue. |
| 4-methyl-5-bromo-7-methoxy-ethoxy-isatin-2-chloride condensed with: | | | | | |
| (40) 4-methoxy-1-hydroxynaphthalene | Blue | 220° | Yellow-green | Green-yellow | Blue. |
| (41) 4-chloro-1-hydroxynaphthalene | Blue | 213° | Green | Yellow | Blue. |
| (42) 4-bromo-1-hydroxynaphthalene | Blue | 209° | Green | Yellow | Blue. |
| 4-methoxy-ethoxy-5-bromo-7-methyl-isatin-2-chloride condensed with: | | | | | |
| (43) 4-methoxy-1-hydroxynaphthalene | Blue | 225° | Green | Yellow | Blue. |

The dyestuffs named in the table correspond with the following formulas:—

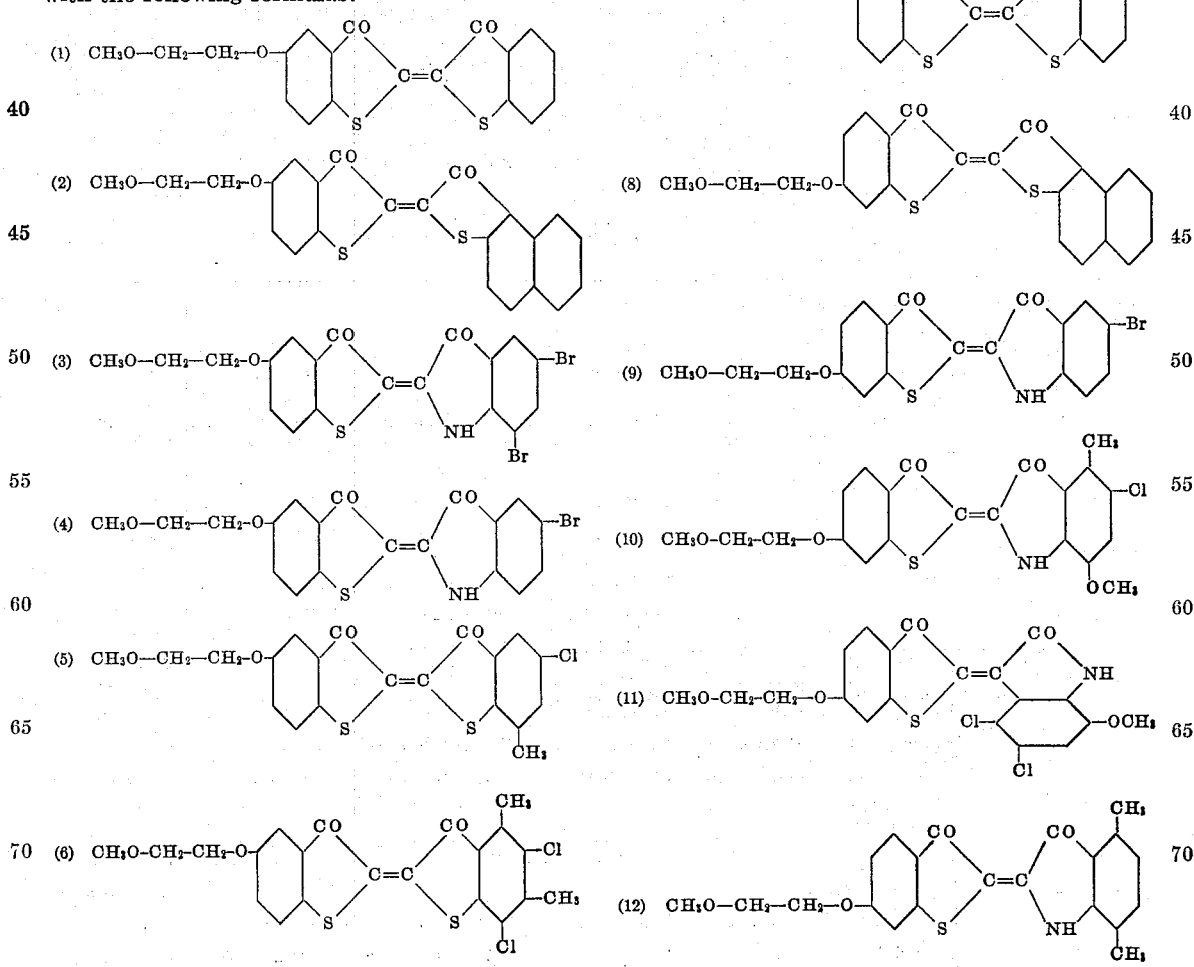

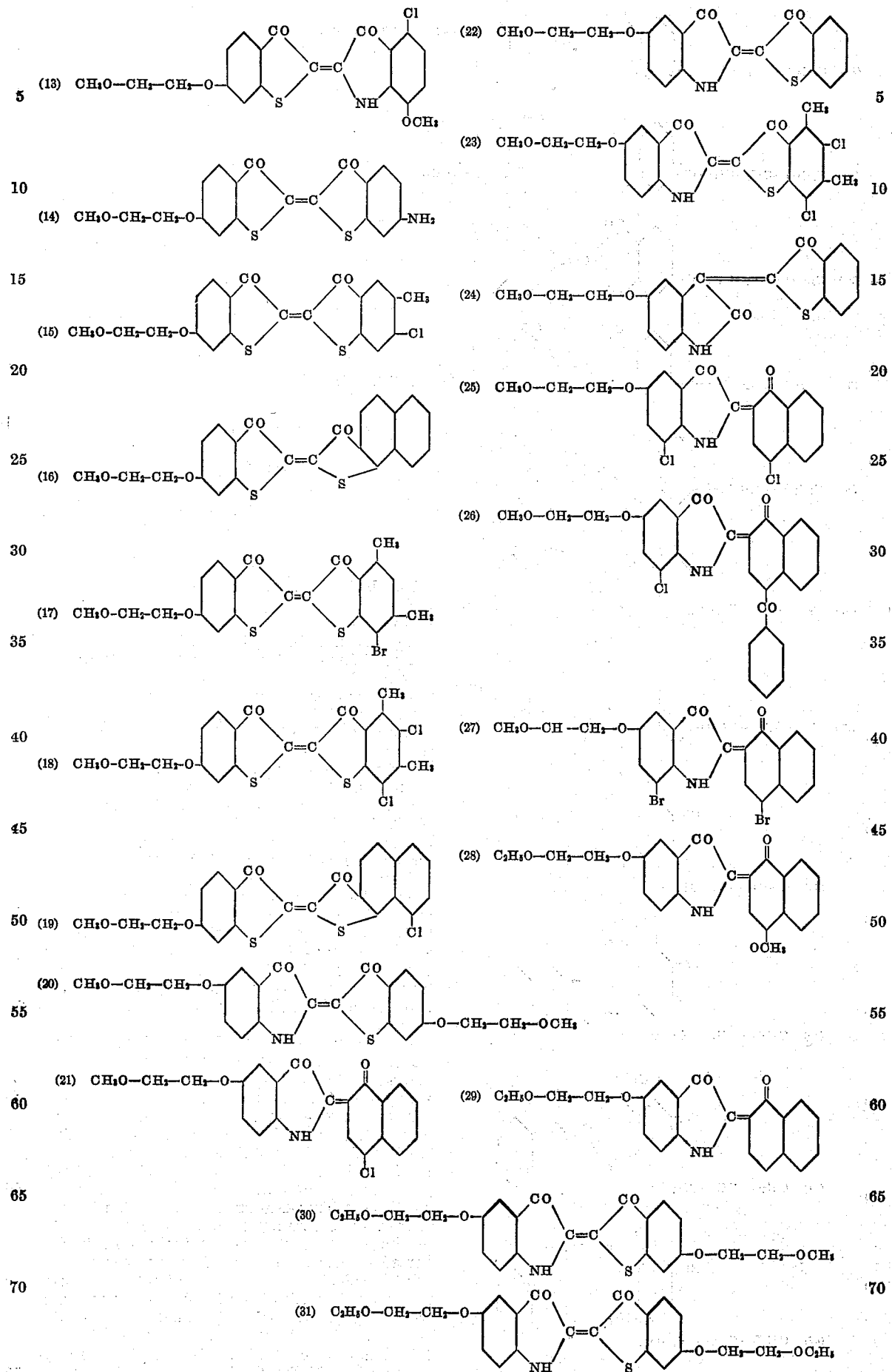

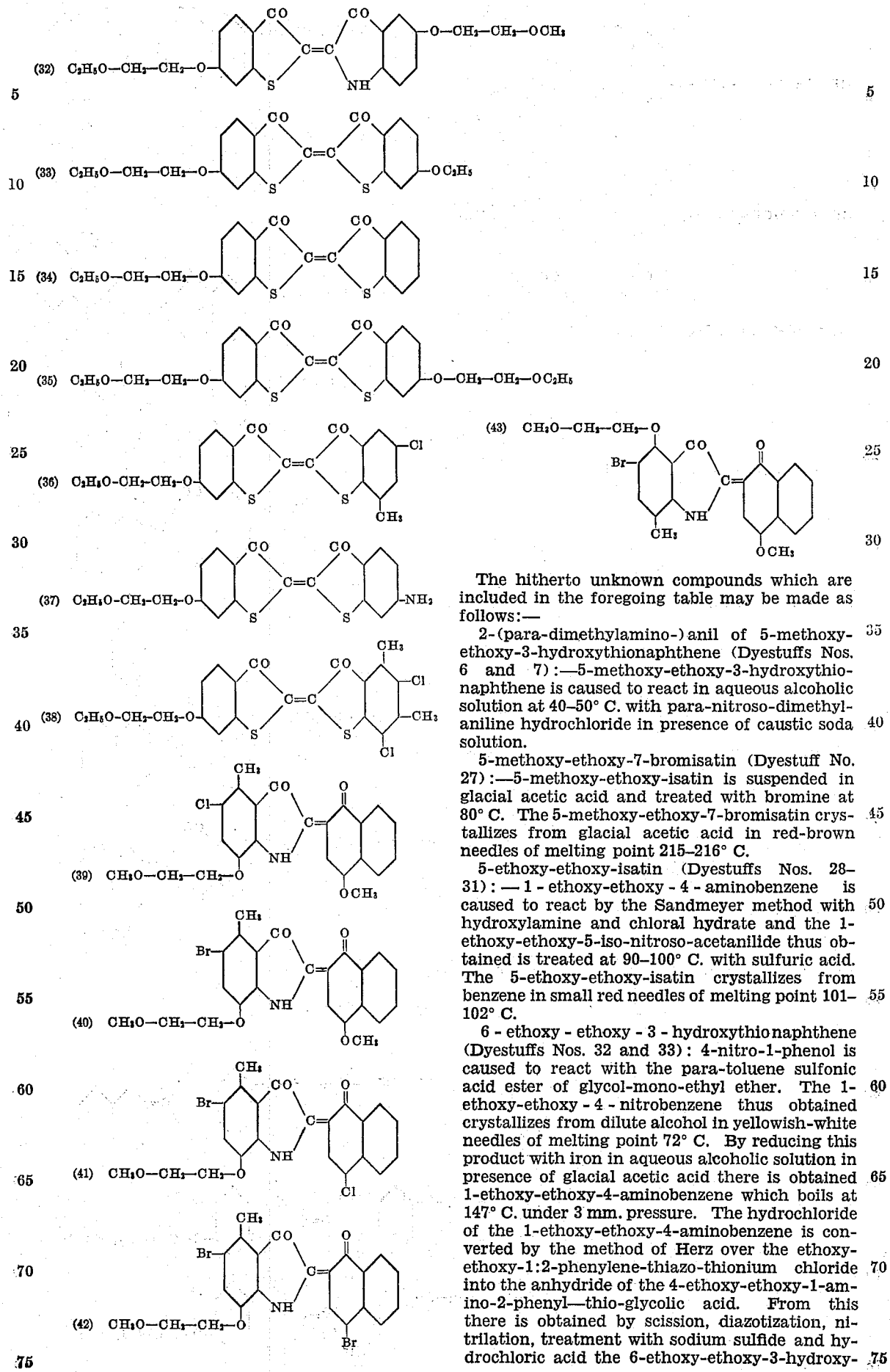

The hitherto unknown compounds which are included in the foregoing table may be made as follows:—

2-(para-dimethylamino-)anil of 5-methoxy-ethoxy-3-hydroxythionaphthene (Dyestuffs Nos. 6 and 7):—5-methoxy-ethoxy-3-hydroxythionaphthene is caused to react in aqueous alcoholic solution at 40–50° C. with para-nitroso-dimethylaniline hydrochloride in presence of caustic soda solution.

5-methoxy-ethoxy-7-bromisatin (Dyestuff No. 27):—5-methoxy-ethoxy-isatin is suspended in glacial acetic acid and treated with bromine at 80° C. The 5-methoxy-ethoxy-7-bromisatin crystallizes from glacial acetic acid in red-brown needles of melting point 215–216° C.

5-ethoxy-ethoxy-isatin (Dyestuffs Nos. 28–31): — 1 - ethoxy-ethoxy - 4 - aminobenzene is caused to react by the Sandmeyer method with hydroxylamine and chloral hydrate and the 1-ethoxy-ethoxy-5-iso-nitroso-acetanilide thus obtained is treated at 90–100° C. with sulfuric acid. The 5-ethoxy-ethoxy-isatin crystallizes from benzene in small red needles of melting point 101–102° C.

6 - ethoxy - ethoxy - 3 - hydroxythionaphthene (Dyestuffs Nos. 32 and 33): 4-nitro-1-phenol is caused to react with the para-toluene sulfonic acid ester of glycol-mono-ethyl ether. The 1-ethoxy-ethoxy - 4 - nitrobenzene thus obtained crystallizes from dilute alcohol in yellowish-white needles of melting point 72° C. By reducing this product with iron in aqueous alcoholic solution in presence of glacial acetic acid there is obtained 1-ethoxy-ethoxy-4-aminobenzene which boils at 147° C. under 3 mm. pressure. The hydrochloride of the 1-ethoxy-ethoxy-4-aminobenzene is converted by the method of Herz over the ethoxy-ethoxy-1:2-phenylene-thiazo-thionium chloride into the anhydride of the 4-ethoxy-ethoxy-1-amino-2-phenyl—thio-glycolic acid. From this there is obtained by scission, diazotization, nitrilation, treatment with sodium sulfide and hydrochloric acid the 6-ethoxy-ethoxy-3-hydroxythionaphthene which forms needles melting at 84–85° C.

2-(para-dimethylamino-)anil of 6 - ethoxy-ethoxy-3-hydroxythionaphthene (Dyestuff No. 38):—6-ethoxy-ethoxy-3-hydroxythionaphthene is caused to react in aqueous alcoholic solution at 40–50° C. with para - nitroso - dimethylaniline - hydrochloride in presence of caustic soda solution; the 2-(para-dimethylamino - ) anil of 6-ethoxy-ethoxy-3-hydroxythionaphthene crystallizes from benzene in needles of melting point 121° C.

4 -methyl-5-chloro - 7 - methoxy-ethoxy-isatin (Dyestuff No. 39):—1-hydroxy-2-nitro-4-methylbenzene is converted by treatment with the para-toluene sulfonic acid ester of the glycol-mono-methyl ether into 1-methoxy-ethoxy-2-nitro-4-methylbenzene. From this product there is obtained by reduction the 1-methoxy-ethoxy-2-amino-4-methylbenzene which by the method of Sandmeyer is converted over the 1-methoxy-ethoxy - 4 - methyl- 2 -iso-nitroso-acetanilide of melting point 133° C. into the 4-methyl-7-methoxy-ethoxy-isatin. This isatin crystallizes from benzene in red-orange needles of melting point 161° C. The chlorination is carried out in a suspension in glacial acetic acid at 70–80° C. by means of sulfuryl chloride. The chlorinated 4-methyl-7-methoxy-ethoxy-isatin crystallizes in red laminae of melting point 170° C.

4-methyl-5-bromo-7-methoxy - ethoxy - isatin (Dyestuffs Nos. 40–42):—the 4-methyl-7-methoxy-ethoxy-isatin is brominated at the boiling temperature by bromine in a glacial acetic acid suspension; the brominated 4-methyl-7-methoxy-ethoxy-isatin crystallizes from chlorobenzene in red needles of melting point 185° C.

4-methoxy-ethoxy-5-bromo - 7 - methyl-isatin (Dyestuff No. 43):—1-hydroxy-3-nitro-4-methylbenzene is converted by treatment with the para-toluene sulfonic acid ester of glycol-mono-methyl ether into 1-methoxy-3-nitro-4-methylbenzene of melting point 54° C. From this product there is obtained by reduction the 1-methoxy-ethoxy-3-amino-4-methylbenzene which boils under 9 mm. pressure at 172° C. This may be converted by the Sandmeyer method by action of hydroxylamine and chloral hydrate into the 1-methoxy-ethoxy-4-methyl-3-iso-nitroso-acetanilide which by treatment with sulfuric acid of 92 per cent. strength at 100° C. yields 4-methoxy-ethoxy-7-methyl-isatin of melting point 175° C. From this product there is obtained by action of bromine in a suspension of glacial acetic acid at 80° C. the brominated 4-methoxy - ethoxy - 7 - methyl-isatin which crystallizes from glacial acetic acid in red orange needles of melting point 213° C.

What I claim is:—

1. Indigoid vat dyestuffs containing in their molecule at least one alkoxy-alkoxy group.

2. Indigoid vat dyestuffs of the general formula

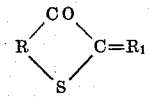

wherein R represents a benzene nucleus substituted by at least one alkoxy-alkoxy group and $R_1$ represents the radical of an indigoid component.

3. Indigoid vat dyestuffs of the general formula

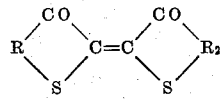

wherein R represents a benzene nucleus substituted by at least one alkoxy-alkoxy group and $R_2$ represents a benzene nucleus.

4. Indigoid vat dyestuffs of the general formula

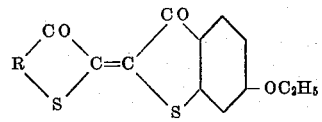

wherein R represents a benzene nucleus substituted by at least one alkoxy-alkoxy group.

5. The indigoid vat dyestuff of the formula

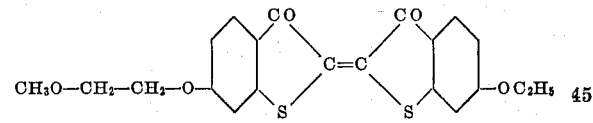

JAROSLAV FROEHLICH.